Jan. 8, 1963   W. E. WATERS   3,072,847
MICROWAVE DETECTOR EMPLOYING A REFLEX KLYSTRON
REPELLER VOLTAGE AS CONTROL SIGNAL
Filed July 30, 1957

INVENTOR
*WILLIAM E. WATERS*

BY
W.E. Thibodeau, T.J. Lynch, F.E. McGee & J.P. Edgerton patented Jan. 8, 1963

3,072,847
MICROWAVE DETECTOR EMPLOYING A REFLEX KLYSTRON REPELLER VOLTAGE AS CONTROL SIGNAL
William E. Waters, Kensington, Md., assignor to the United States of America as represented by the Secretary of the Army
Filed July 30, 1957, Ser. No. 675,232
2 Claims. (Cl. 325—29)
(Granted under Title 35, U.S. Code (1952), sec. 266)

The invention described herein may be manufactured and used by or for the Government for governmental purposes without the payment to me of any royalty thereon.

This invention relates to microwave detectors in general and more particularly to a microwave detector utilizing a reflex klystron.

A radar set or other microwave transmitting and receiving system ordinarily uses a crystal detector to detect the incoming microwave signal. Because of the low power capabilities of such crystal detectors it is necessary to use a so-called T-R tube ahead of the crystal to protect the crystal from the high power transmitter signal. By using a microwave detector which would not be damaged by even fairly large amounts of power leaking from the transmitter, it would be possible to eliminate both the crystals and the T-R tube. Elimination of the T-R tube would result in a considerable simplification of conventional transmitting and receiving systems.

In this invention an oscillating reflex klystron is adapted to operate as a microwave detector. This is accomplished by adjusting the voltage on the repeller of the klystron to provide a small repeller current. Then, by applying the microwave signal to be detected to the output of the oscillating klystron, the detected beat frequency signal will appear as variations in the klystron repeller current. If such a klystron microwave detector is used in a radar system there will be no need to use a protecting T-R tube because considerable power can be applied to the klystron output without damaging the klystron. A further advantage of the klystron microwave detector over present-day crystal detectors is that this detector can be ruggedly constructed and will operate at very high or very low temperatures. On the other hand crystal detectors are fragile and will operate reliably only over a relatively restricted temperature range.

The reflex klystron microwave detector of this invention may also be advantageously used as a combination transmitter and detector for use in an ordnance proximity fuze. Such a utilization makes possible a new type of proximity fuze which operates at microwave frequencies.

An object of this invention is to provide a new type of microwave detector.

Another object is to provide a sensitive microwave detector which will operate at very high or low temperatures, can be made mechanically rugged, and will not be damaged by large pulses of microwave power.

A further object of this invention is to provide a microwave detector for use in a radar system which requires no protecting T-R tube.

Still another object is to provide a combination microwave transmitter and detector.

Yet another object is to provide an improved microwave proximity fuze.

The specific nature of the invention, as well as other objects, uses, and advantages thereof, will clearly appear from the following description and from the accompanying drawing, in which.

Figure 1:
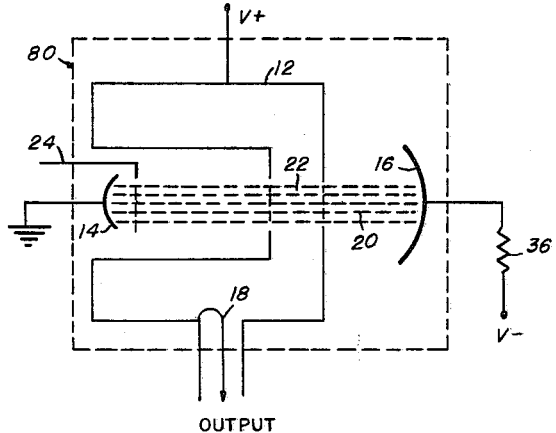
FIGURE 1 is a schematic representation of a reflex klystron oscillator.

FIGURE 1 illustrates the elements of a conventional reflex klystron. The reflex klystron comprises a cathode 14 at ground potential, a focusing and accelerating element 24, a cavity resonator 12 that also serves as an anode and is connected to a positive voltage V+, and a repeller electrode 16 that is connected to a negative voltage V— through a resistor 36. The dashed line represents an evacuated envelope 80.

During operation of the reflux klystron, the electron beam 20 passes through a gap 22 in the resonator 12 and travels toward the repeller. As conventionally used, a sufficient negative voltage V— is applied to the repeller 16 so that the electrons never reach the repeller 16. The negative voltage V— on the repeller 16 turns the electrons back towards the resonator 12 and the electrons pass through the gap 22 a second time. By proper adjustment of the repeller voltage V— —that is, by placing the klystron on mode— microwave oscillations are made to occur. Energy is coupled out of the cavity by a one-turn coupling loop 18.

For operation as a microwave detector, in accordance with the invention, the operation of the conventional reflex klystron is modified. The voltage V— on the repeller 16 is reduced to a sufficiently low value to provide a small repeller current; that is the klystron is adjusted to oscillate on a mode which requires a low repeller voltage. For such operation the repeller voltage V— will be smaller than the R.-F. voltage across the gap 22. Therefore the fastest electrons, having been accelerated by the R.-F. voltage, will strike the repeller and provide a small repeller current. The number of electrons striking the repeller 16 will be small in relation to the total beam current. For such a condition the repeller current is referred to as a "small repeller current."

Figure 2:
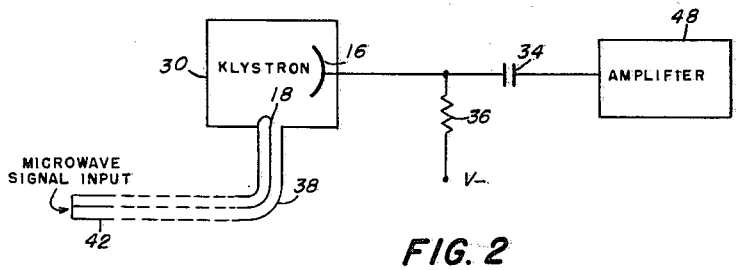
FIGURE 2 is a schematic representation of a reflex klystron microwave detection system in accordance with the invention.

FIGURE 2 shows how the modified reflex klystron can be used as a microwave detection system. In FIGURE 2 the numeral 30 represents an oscillating reflex klystron as shown in FIGURE 1 having the voltage V— on its repeller 16 adjusted to provide a small repeller current. The microwave signal to be detected is fed into the output 38 of the klystron 30 through waveguide or coaxial cable 42 of the appropriate dimensions.

In FIGURE 2 the input signal mixes with the signal generated by the klystron 30 itself, the mixing taking place at the resonator gap 22 (FIGURE 1). If the two signals are close in frequency as is ordinarily the case, they will undergo a periodic variation in phase, sometimes adding and sometimes substracting. The repeller current will follow this variation at a frequency which is the numerical difference between the frequency of the microwave input signal and the frequency generated by the klystron 30. A resistor 36 in series with the repeller 16 transforms the variations in the repeller current into a difference-frequency voltage. This difference-frequency voltage can then be applied to a conventional amplifier 48 tuned to this difference frequency. A capacitor 34 provides D.-C. blocking.

The detection system of FIGURE 2 may be incorporated into a radar system. In such an arrangement a sensitivity of $10^{-12}$ watt has been achieved with a bandwidth of 198 kc./sec. By designing the conventional reflex klystron 30 for more efficient operation under the modified operating conditions necessary for use as a microwave detector, it is possible to match or exceed the sensitivity of the conventional crystal detectors in radar sets. Because the klystron will not be damaged by large amounts of power no protecting T-R tube will be needed and the entire radar system can be simplified appreciably.

Figure 3:
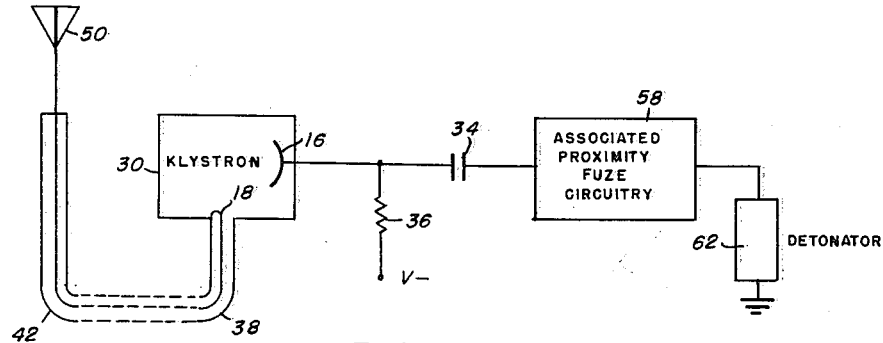
FIGURE 3 is a schematic representation of a microwave proximity fuze in accordance with the invention.

FIGURE 3 shows how the invention may be utilized as a microwave proximity fuze. The oscillating klystron 30 as in FIGURE 2 has the voltage V— on its repeller 16 adjusted to provide a small repeller current. An antenna 50 is connected to the output 38 of the klystron 30 through waveguide or coaxial cable 42 of the appropriate dimensions. The antenna 50 is used for both transmitting and receiving. The oscillating klystron 30 and antenna 50 thus act as a combination transmitter and detector. The reflected target signal mixes with the transmitted signal generated by the klystron at the resonator gap 22 (FIGURE 1) as described in connection with FIGURE 2 to produce a repeller current varying at the difference frequency. These variations in the repeller current occur at the Doppler frequency, which is well known in the art. A resistor 36 in series with the repeller 16 transforms the Doppler variations of the repeller current into a Doppler voltage. This doppler signal can then be applied to associated proximity fuze circuitry 58 which is well known to those in the art to function an explosive detonator 62. For an example of a circuit which can be utilized as fuze circuitry 58, see FIGURE 4 of U.S. Patent No. 2,696,103 issued to L. B. Heilprin et al. on Dec. 7, 1954. Photoflash indicator 1 in the patent would be replaced by detonator 62.

It is possible to view the operation of the microwave proximity fuze described above in an alternative way. The antenna 50 connected to the output 38 of the oscillating klystron 30 can be viewed as the klystron load. As the antenna 50 approaches a target its radiation resistance will vary, varying the load on the klystron 30 and causing a change in the power level of the oscillations. These variations in the power level of the oscillations cause corresponding variations in the repeller current, thereby producing a Doppler variation of repeller current. Therefore, if a load connected to the klystron output 38 varies in response to a microwave signal, the detected signal will appear as variations in the repeller current.

Using the above described system as a microwave proximity fuze a reflection from a target as small as 102 db below a 10-milliwatt klystron power output has been detected for a klystron frequency of 8200 megacycles using a repeller resistor 36 of 820 Kohms and an amplifier bandwidth of 198 kc. By designing a reflex klystron for better operation as a microwave detector it has been possible to achieve a sensitivity of 114 db below 10 milliwatts into an amplifier bandwidth of 1 megacycle.

It should be noted that the invention can be applied advantageously to practically any type of microwave transmitting and receiving system. For example, a proximity fuze which provides more detailed target information could be obtained by amplitude modulating the repeller voltage V— of the proximity fuze system shown in FIGURE 3. Such amplitude modulation on the repeller 16 will cause the signal generated by the klystron 30 to be frequency modulated. The detected signal in the repeller current therefore will contain not merely the Doppler signal but also additional frequency components, some of which will be present even when there is no relative motion between fuze and targets. Such signals may be utilized to give additional target information.

It will be apparent that the embodiment shown is only exemplary and that various modifications can be made in construction and arrangement within the scope of the invention as defined in the appended claims.

I claim:

1. A microwave proximity fuze system utilizing a reflex klystron as both the transmitter and the detector of said system, said reflex klystron comprising: a cathode at a predetermined potential serving as a source of electrons, means for focusing and accelerating said electrons into an electron beam, a resonant cavity having a gap through which said beam is passed, output coupling means communicating with said cavity, and a repeller electrode toward which said beam travels after leaving said gap; means for simultaneously operating said reflex klystron structure as both a transmitter and a detector comprising: first voltage means connected to said cavity for causing said reflex klystron to oscillate at a signal frequency and second voltage means connected to said repeller electrode for maintaining said repeller electrode at a potential level close to said cathode potential thereby causing a small current to flow in said repeller electrode, an antenna connected to said output coupling means adapted to radiate the oscillation signal generated by said reflex klystron towards a target, said antenna picking up the reflected signal from said target and applying it to said cavity through said output coupling means, the reflected signal thereby being mixed at said gap with the oscillation signal frequency produced by said reflex klystron structure causing a Doppler frequency signal current to flow in said repeller electrode; proximity fuze circuitry, and circuit means connected to said repeller electrode for utilizing said Doppler frequency signal current to activate said proximity fuze circuitry when said Doppler signal reaches a predetermined level and predetermined frequency.

2. A microwave detector comprising in combination: a reflex klystron structure having a cathode at a predetermined potential serving as a source of electrons, means for focusing and accelerating said electrons into an electron beam, a resonant cavity having a gap through which said beam is passed, means for applying the microwave signal to be detected to said cavity so as to excite said cavity and produce an R.-F. voltage across said gap corresponding to said microwave signal, and a repeller electrode toward which said beam travels after leaving said gap; first voltage means connected to said cavity for causing said reflex klystron structure to oscillate and second voltage means connected to said repeller electrode for maintaining said repeller electrode at a potential level close to that of said cathode and thus causing a small current to flow in said repeller electrode, the microwave signal to be detected thereby being mixed at said gap with the oscillation signal frequency produced by said reflex klystron structure causing the current flowing in said repeller electrode to vary at a frequency which is the numerical difference between the oscillation frequency and the frequency of said microwave signal; and circuit means connected to said repeller electrode for utilizing the difference frequency variations in the repeller current.

References Cited in the file of this patent

UNITED STATES PATENTS

| | | |
|---|---|---|
| 2,220,841 | Metcalf | Nov. 5, 1940 |
| 2,293,180 | Terman | Aug. 18, 1942 |
| 2,414,843 | Verian et al. | Jan. 28, 1947 |
| 2,602,137 | Hansen | July 1, 1952 |
| 2,804,545 | Clark | Aug. 27, 1957 |